UNITED STATES PATENT OFFICE.

JEAN EFFRONT, OF BRUSSELS, BELGIUM, ASSIGNOR TO THE SOCIÉTÉ GÉNÉRALE DE MALTOSE, OF SAME PLACE.

PROCESS OF FERMENTING.

SPECIFICATION forming part of Letters Patent No. 478,418, dated July 5, 1892.

Application filed May 18, 1891. Serial No. 393,204. (No specimens.) Patented in Austria-Hungary December 18, 1888, No. 18,113; in France December 20, 1888, No. 194,904; in England April 1, 1889, No. 5,564; in Germany September 14, 1889, No. 49,141, and in Belgium November 28, 1889, No. 84,509.

*To all whom it may concern:*

Be it known that I, JEAN EFFRONT, a subject of the King of Belgium, residing at Brussels, in the Kingdom of Belgium, have invented new and useful Improvements in the Process of Fermenting, (for which patents have been obtained in Germany, No. 49,141, dated September 14, 1889; in Belgium, No. 84,509, dated November 28, 1889; in Austria-Hungary, No. 18,113, dated December 18, 1888; in France, No. 194,904, dated December 20, 1888, and in England, No. 5,564, dated April 1, 1889) of which the following is a specification.

My process being based on new data, I am obliged to make some preliminary remarks in order to make clear the description that follows.

It has been proved that the amount of diastase which germinating grain contains does not generally correspond in practice with the theoretical amount which should be produced. Theoretically a minimum quantity of malt should by its yield of active matters convert into saccharine a considerable quantity of amylaceous matter. I find, on the contrary, in practice that a relatively considerable quantity of malt must be used to arrive at even an imperfect degree of saccharification. The cause of this phenomenon is found to be in an impairing of the diastase through the development of ferments which are harmful to it. Thus it is that the malt worts left at the usual temperature for saccharification are impaired by the chemical action referred to and become gradually weaker, so that at the end of a longer or shorter, but always relatively short, time they lose all their activity. The same phenomenon appears during the period of saccharification of amylaceous matters by malt. The germs of the ferment, so abundant in germinating grains, are developed little by little in worts and gradually arrest the action of the diastase. To remedy this difficulty, it has been proposed to add to worts undergoing saccharification various acids, such as nitric, hydrochloric, or sulphuric. These acids preserve the worts more or less from alteration. Unfortunately the quantities of the acids necessary to give this result weaken the diastase to a very considerable degree, and the final result is that nothing or very little as regards saccharification is gained by their use.

The present modes of preserving the worts undergoing saccharification generally consist of assisting them by means of the temperature and by chemical agents not favorable to the development of harmful ferments; but still the desired result has not been obtained, for on the one hand the worts are mixed with simple infusions of malt, which always contain ferments, and on the other hand the chemical being placed in a diluted material cannot act efficaciously, and thus preserve the diastase intact. Taking the facts into consideration I have endeavored to purify malt by an antiseptic which, in weak doses, has no deleterious action on the diastase, but which at the same time will destroy the germs of other ferments and aid the diastase in its growth or formation. In my researches I have discovered that hydrofluoric acid will obtain this result. In fact by adding to a liter of infusion of malt (corresponding to two hundred or three hundred grains of malt) two or three drops of commercial hydrofluoric acid I can preserve it for eight or ten days without the liquid undergoing the least alteration or losing any of its saccharifying principle. I have, besides, discovered that the infusion of malt, acidulated by hydrofluoric acid in the above-named proportions, has its maximum saccharifying power at 25° or 30° centigrade and not at the temperature of 50° to 60° centigrade usually employed for this purpose. The preliminary purification of the malt by hydrofluoric acid allows me to obtain a very economical working, by which means I realize a very considerable saccharification from a small quantity of malt. Further, my first successes led me to apply the same principle to fermentation, and my experiments have shown me that hydrofluoric acid has a very favorable action on the growth or formation of the yeast, that it prevents the development of other ferments, and that its employment increases by this means very considerably the yield of alcohol.

I. *Preparation of infusion of malt and*

*diastase in the form of a concentrated extract.*—I add to the crushed malt diluted with two or three times its volume of cold water ten to twenty grams of commercial hydrofluoric acid containing about twenty per cent. of pure hydrofluoric acid for every hundred liters of liquid, taking care to keep the malt in suspension for some time. The temperature of the mixture of malt, water, and acid is the same as the surrounding temperature of the worts—*e. g.* from 15° to 30°, which is the ordinary temperature of the worts. I mean by this that it is not necessary to heat or cool the mixture. This operation deprives the malt of every germ of foreign ferments and at the same time produces a liquid quite suitable for employment as a liquefying and saccharifying agent. According to the amount of work which this liquor must perform I neutralize at the end of some hours the hydrofluoric acid by means of carbonate of lime, or I leave it as free acid when the liquor is to be used for producing saccharification in materials already containing lime-salts. Instead of employing, as already shown, the diastasic liquor, I can also separate first the dregs, so as only to preserve the amylin and the extract. This amylin and extract can be used as they are, or I can still further separate them by filtration or by decanting or by turbinage, and I then obtain a clear or about clear liquid, which forms an unchangeable infusion. By evaporating this liquid in a vacuum at a maximum temperature of 65° to 70° centigrade I produce a solid diastase in the form of a yellowish powder, an equal weight of which possesses a saccharifying property twenty-five to thirty times stronger than that of malt. The temperature of 65° centigrade must not be exceeded when it is wished to obtain a product of a highly-saccharifying power.

II. *Manufacture of liquid sirups and of sugar.*—As raw material, I employ maize by preference, although my mode of working is adapted equally to starch and all other amylaceous materials. To maize steeped or unsteeped, ground or unground, is added three or four times its volume of water, and it is then boiled under a pressure of three or four atmospheres for one or two hours by means of the usual apparatus. The boiling being finished, the liquid is cooled to 30° or 40° centigrade, either by addition of cold water or by means of a refrigerator at the surface or by any other mode. When brought to this temperature, I add thereto the diluted malt or the infusion with amylin or the clear extract of malt, or even the solid diastase prepared, as detailed in the preceding paragraph I. I employ from five to thirty per cent. of malt, according to the degree of saccharification which it is desired to obtain. The temperature of the liquid after the addition thereto of the infusion should fall from 15° to 25° centigrade, and it is then left for saccharification, of which the duration may vary from several hours to forty-eight hours, according to the nature of the product I wish to obtain and the quantity of dextrine I wish to retain therein. If the materials contain dregs in suspension, as is the case with maize and cereals generally, I can, after two or more hours, separate these dregs either by means of a filter-press, or by turbinage, or by sifting, or by any other method generally employed. The filtered liquor is then passed into the setting-vats, where the saccharification goes on vigorously at a temperature of about 20° centigrade. According to whether I wish to obtain a sirup or solidified product, I arrest the saccharification more or less quickly. I boil the liquor then with a little of carbonate of lime. Afterward the liquor is evaporated at 38° to 40° Baumé after a preliminary filtration on any kind of filter.

III. *Alcoholic fermentation.*—My system of making alcohol is based on the same method as that for the manufacture of sirups, as shown above. Maize or other similar articles, with or without previous bruising, must be thoroughly crushed under pressure and worked in the same manner as when the infusion of malt is added. Diastase, with the addition of hydrofluoric acid, as described above, is then added in one of the forms cited at the temperature named for the manufacture of sirups, either in the form of concentrated diastase or in the form of a clear infusion with or without amylin or finally in the form of ground malt. As soon as the saccharification is thoroughly commenced I add to the liquid, filtered or not, yeast which has remained for several hours in contact with hydrofluoric acid used at the rate of fifteen to twenty grams of acid of commerce—at about twenty per cent. of pure acid—per hectoliter of liquid yeast. The employment of a diastase agent and of a yeast very active and deprived of the elements in them detrimental to alcoholic fermentation allows me to obtain regularly a return of thirty-eight liters of alcohol per one hundred kilos of maize containing sixty-three per cent. of amylin.

I have further discovered in the course of my investigations that commercial hydrofluoric acid, in the proportion of five to fifteen grams per hectoliter of wort, can be employed as a simple preservative and that without modifying in the slightest any one of the ordinary processes in use in manufactories. The addition of hydrofluoric acid in the above-named proportion can be made before, during, or after saccharification, before or after the addition of the yeast, and during the fermentation, and even before the boiling under pressure in a given quantity, which may be even considerably increased if care be taken to correct the too great acidity after boiling. I have also found that the preservative action of hydrofluoric acid acts not only on the diastase, but also on the yeast, preserving the latter, and that if care be taken during the saccharification of amylaceous substances by acids with the view of obtaining alcohol to add to the worts, either before or after the saccharification, before or after the addition of the yeast, or even during the course of the fermentation, any quantity of hydrofluoric acid may be added up to the point where fermentation is possible, resulting in a much greater return than usual. On this subject it may be observed that if in the boiling of feculent and amylaceous substances, either with a view to the production of starch, sugar, or to alcoholic fermentation, sulphuric, oxalic, hydrochloric, or other acids generally used be replaced by commercial hydrofluoric acid, it suffices to employ one per cent. at most of this latter to yield at the end of one or two hours under a pressure of three atmospheres wort saccharified to at least nine-tenths. The point is very important, as it means the use of a relatively very small quantity of acid and because the fluoride of calcium formed during neutralization is much less soluble than sulphate of lime, and consequently is eliminated more thoroughly and easily.

Especially in the case of the treatment of feculent and amylaceous substances with a view to alcoholic fermentation it will be sufficient after boiling to neutralize with carbonate of lime up to a point at which it can be determined by an experiment (test) that the acidity remaining is not in excess for the purpose of fermentation. The same results are obtained in the case of the fermentation of worts from beet-root and molasses. In the case of molasses in particular I have discovered that if, instead of adding, as usual, about one per cent. of commercial hydrofluoric acid per one hundred kilos of molasses, a sufficient quantity of sulphuric acid be first added to render them slightly acid, and then care be taken besides to add the required quantity of commercial hydrofluoric acid and generally a quantity of five to fifteen grams of commercial hydrofluoric acid per hectoliter of wort suffices, not only will a larger yield of alcohol be obtained, but also a much greater one of carbonate of potash than is the case at present in the production of alcohol by means of sulphuric acid. Finally I have found that in the treatment of any raw material for producing alcoholic fermentation and yielding a residue utilizable in any manner, either for the feeding of cattle or for any other purpose, if care be taken either before or after distillation to add to the fermented worts or to the residue a quantity of about five to fifteen grams of hydrofluoric acid or more per hectoliter of wort or mash, the duration of their keeping is greatly enhanced. This is of great importance for manufactures of alcohol, especially for those who have need to keep the residues for several days or for those who intend to utilize them. If further care be taken when the residue is required for use to add a small quantity of lime, potash, soda, or even of any other alkalies or salts capable of neutralizing hydrofluoric acid, the article is then rendered immediately available without any change and similar to that produced only a few hours before.

By the addition of a stronger dose of acid it is possible to preserve the residue for almost an indefinite time.

I am aware that it has been proposed to use chemical compounds containing fluorine for antiseptic purposes in general. My invention relates specifically to the manufacture of diastase, sirups, and alcohol from amylaceous substances, in which process I have found very beneficial results from the introduction of dydrofluoric acid in the mash of infusion, as explained. It has also been found that the salts of the hydrofluoric acid and some other fluoridex combinations have the same properties as the acid and that these substances preserve especially the wort from acidification, resist the lactic and butyric fermentation, preserve the vitality of the diastase, and stimulate the action of the yeast.

In order to utilize the fluoride combinations in the work of saccharification and fermentation, there is added direct to the infusion or to the wort to be saccharified twenty grams per hectoliter of a soluble acid, fluoride, neutral fluoride, double fluoride, fluoride or boron in a gaseous state, hydrofluosilicic acid, fluoboric acid, or their salts.

The fluorides of ammonium, sodium, and the soluble double fluoride of potassium and sodium are the ones preferred. For fermentation these fluorides are mixed with the yeast or added direct to the worts intended to be fermented. The quantity of twenty grams per hectoliter is not an invariable one. The addition of ten grams even has some action, while certain salts may be used in relatively stronger proportions. In certain cases fifty grams per hectoliter may be used.

Since my first experiments were completed, I have also found by subsequent trials that, instead of performing the process of acidification in the manner now used in the manufacture of yeast in distilleries or of compressed barm, a certain percentage of hydrofluoric acid or of some fluoride may be added; second, that in the production of malt the addition of a proper amount of hydrofluoric acid or fluorides produces a favorable action during the germination of the grain and endows the malt with a special power of preservation; third, that hydrofluoric acid and fluorides exert a beneficial influence in the fermentation of beer by preventing accidents injurious to the fermentation and by making the latter more uniform.

My process of manufacture of yeast of barm may be described as follows: The malted grain is first submitted to saccharification in the ordinary manner. After allowing this to continue for three quarters of an hour or one hour the mass is cooled down to a temperature of from 18° to 22° centigrade and from six to ten grams of hydrofluoric acid per one hundred liters of must is added, or an equivalent amount of a suitable fluoride may be employed instead. The yeast is then added, either in its natural or in a compressed condition, and when the density of the must is reduced by half the yeast is removed, and thus yeast is obtained ready for immediate use. The manufacture of yeast by this method offers the following advantages:

(a) The acidification hitherto practiced being here dispensed with enables yeast to be manufactured in much less time—say within eight to ten hours.

(b) The yeast forms in a uniform and reliable manner, owing to the prevention of lactic and butyric fermentation.

(c) The yeast obtained by this method retains a large amount of unexhausted diastase, while in the yeast prepared by the process of acidification hitherto employed no such diastase is left. This retention of diastase in the yeast will be found of advantage in distilleries, as it enables a considerable amount of malt to be saved by causing a saccharification of amylaceous matters to take place at the same time as the fermentation.

The employment of hydrofluoric acid or of fluorides during the germination of the grain may be as follows: The grain to be submitted to germination is first washed and then soaked in water containing eight to twelve grams of hydrofluoric acid or of corresponding percentage of a suitable fluoride per one hundred liters, whereupon the grain is allowed to germinate. The malt thus obtained contains much less acid than ordinary malt and is free from injurious ferment. Not only does its employment enable the percentage of hydrofluoric acid or fluorides to be considerably reduced, but it even permits in most cases of dispensing with these agents altogether during the saccharification and the fermentation. The malt thus prepared is much less liable to deterioration and admirably answers the purpose of the brewing industry.

The employment of hydrofluoric acid or fluorides during the fermentation of beer may be as follows: There is added to the beer before the fermentation at any desired stage of its manufacture, but preferably at the moment when it is conveyed to the cooling apparatus for fermentation about five grams of hydrofluoric acid or of a suitable fluoride per one hundred liters of beer.

The above proportions are given merely as examples.

Having thus described my said invention and in what manner the same is to be performed, I declare that what I claim is—

1. The process of preventing the development of injurious and destructive ferments in the manufacture of sirups, sugar, alcohol, beer, pressed yeast, &c., which consists in subjecting the amylaceous substances entering into the said manufacture to the action of fluorine compounds in about the proportions specified, substantially as set forth.

2. The process of preventing the development of injurious and destructive ferments in the manufacture of sirups, sugar, alcohol, beer, pressed yeast, &c., which consists in subjecting the amylaceous substances employed in the said manufacture to the action of diastase which has been previously mixed with fluorine compounds in about the proportions and manner indicated, substantially as and for the purpose set forth.

3. The process of preventing the development of injurious and destructive ferments in the manufacture of sirups, sugar, alcohol, beer, pressed yeast, &c., which consists in subjecting the amylaceous substances to the action of diastase and fluorine compounds and then adding yeast which has been treated with fluorine compounds, substantially as and for the purpose set forth.

4. In the manufacture of diastase, the process for preventing the development of injurious and destructive ferments, which consists in making an infusion of malt, adding thereto a compound of fluorine in the proportion indicated, and finally separating the residues from the diastase solution, substantially as set forth.

5. The process of saccharification, which consists in subjecting the amylaceous substances at a low temperature from 20° to 30° centigrade to the action of an infusion of malt treated with a compound of fluorine, substantially in the manner hereinbefore described.

6. The process of preventing the development of injurious and destructive ferments in the manufacture of sirups, sugar, alcohol, beer, pressed yeast, &c., which consists in subjecting the amylaceous substances employed in the said manufacture to the action of hydrofluoric acid in about the proportions and in the manner specified.

JEAN EFFRONT.

Witnesses:
AUG. TOERISSEN,
JOSEPH GOFFIN.